May 25, 1965 R. H. SHEETS 3,185,134
VALVE MEANS FOR WATERERS AND THE LIKE
Filed June 1, 1962
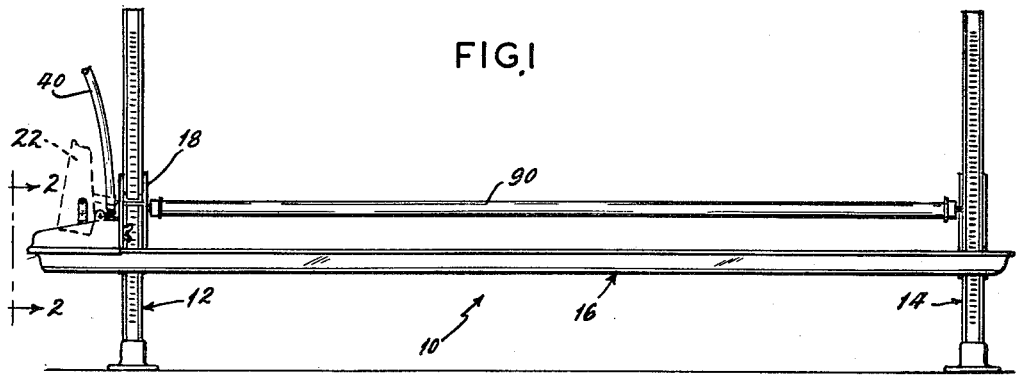
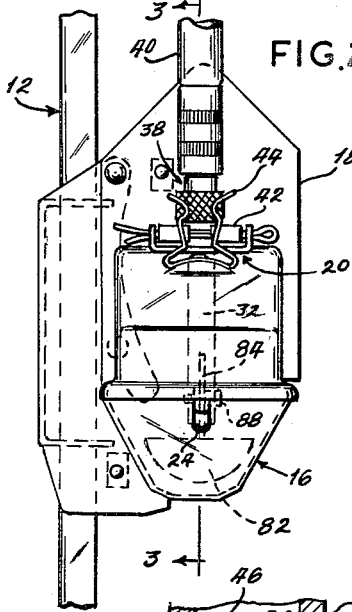
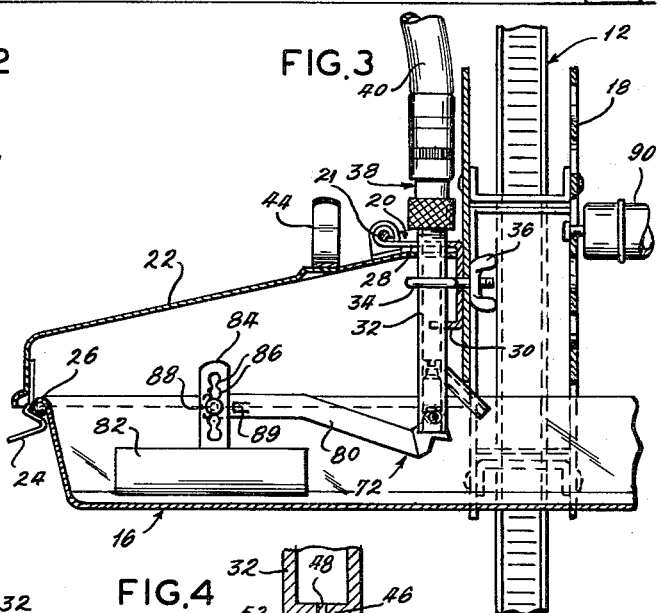
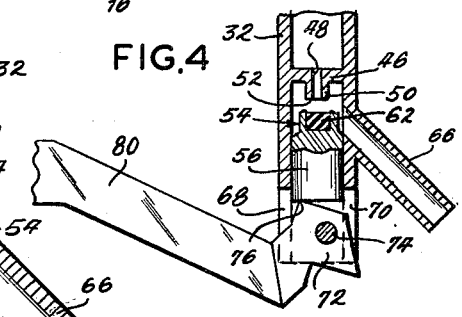
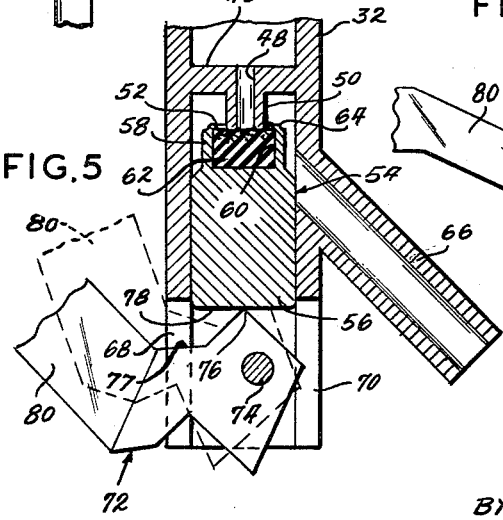
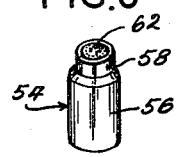
INVENTOR:
RAY H. SHEETS
BY Gravely, Lieder & Woodruff
ATTORNEYS.

United States Patent Office 3,185,134
Patented May 25, 1965

3,185,134
VALVE MEANS FOR WATERERS AND THE LIKE
Ray H. Sheets, St. Louis County, Mo., assignor to Jackes-Evans Manufacturing Company, St. Louis, Mo., a corporation of Missouri
Filed June 1, 1962, Ser. No. 199,395
4 Claims. (Cl. 119—80)

The present invention relates generally to valve devices and more particularly to valve devices for poultry waterers and like devices.

Many different kinds of devices have been used for watering poultry and most of these have included trough means and valve means for controlling the water level in the trough. For the most part, however, the known devices have been relatively complicated to make and difficult to adjust and clean. Furthermore, the valve means employed heretofore have been relatively subject to interference by the poultry and also to dirt and debris that normally accumulates from poultry. These and other disadvantages and shortcomings of known valve devices especially when employed on poultry waterers and the like are overcome by the present valve device.

Briefly, the present device comprises a watering trough supported in elevated position on spaced supports, a hinged cover mounted on one end portion of the trough, and valve means mounted on the covered end portion of said trough, said valve means including an upright tubular member extending downwardly into the trough, conduit means connecting the upper end of the tubular member to a source of water, a valve seat positioned in the tubular member intermediate the ends thereof, an outlet in the tubular member below said valve seat, a valve member slidably positioned in the tubular member below the valve seat and having an upper surface that cooperates with the valve seat to prevent passage of water from the conduit to the outlet, and operator means engageable with said valve member, said operator means including a pivoted operator member having one end engageable with the bottom surface of the valve member and a float on the other end of said arm, said float responding to the depth of water in the trough to control the movement of the valve member into and out of engagement with the valve seat.

It is a main object of the present invention to provide improved valve means for poultry waterers and like devices.

Another object is to reduce the time required to care for poultry and other livestock.

Another object is to provide relatively inexpensive, trouble free and easy to operate and clean valve means for watering devices.

Another object is to provide automatic means for controlling water depth in a drinking trough, which means are adjustable to change the regulated water depth.

These and other objects and advantages of the present invention will become apparent after considering the following description of a preferred embodiment of the invention in conjunction with the accompanying drawing which forms a part thereof.

In the drawing:
FIG. 1 is a side elevational view of a drinking trough for poultry and the like having valve means constructed according to the present invention;
FIG. 2 is an enlarged fragmentary end view of the waterer of FIG. 1 taken on line 2—2 therein;
FIG. 3 is a fragmentary cross-sectional view of the same waterer taken on line 3—3 in FIG. 2;
FIG. 4 is an enlarged fragmentary cross-sectional view taken through the center of the valve portion only of the subject device, the valve being shown in open condition;
FIG. 5 is a still further enlarged fragmentary cross-sectional view similar to FIG. 4 but showing the valve in closed condition; and
FIG. 6 is a perspective view of the movable valve member per se.

Referring to the drawings by reference numbers, number 10 refers generally to a poultry waterer embodying the features of the present invention. The waterer 10 has a pair of similar spaced upright pedestals 12 and 14 and a substantially horizontal trough 16 supported extending therebetween. The trough 16 is attached to the pedestals by bracket assemblies 18 which include means slidably engageable with the pedestals 12 and 14 for adjusting the heighth of the trough and for leveling the trough.

The bracket assembly 18 at one end of the trough has a substantially U-shaped member 20 connected thereto as shown in FIG. 3. The member 20 has a hinge connection 21 with a cover member 22 shaped to enclose a space above the associated end portion of the trough 16. The cover member 22 also has a spring clasp 24 on the free end thereof that engages a beaded portion 26 on the end of the trough to hold the cover member in closed position. The U-shaped member 20 has upper and lower flanges 28 and 30 with vertically aligned notches formed therein.

A tubular valve member 32 is positioned extending through the said notches and is held in this position by a screw eye 34 and a wing nut 36. By loosening the wing nut 36 the valve assembly can be raised or lowered as required for the best adjustment. The upper end of the tubular member 32 has fitting means 38 for connection to a water conduit or hose 40.

The cover member 22 also has a spring clamp 44 attached to its upper surface. The clamp 44 cooperates with the fitting 38 when the cover member is raised to support the cover in raised position, see FIG. 1.

The tubular member 32 has an annular valve seat portion 46 positioned therein at an intermediate location as shown in FIGS. 4 and 5. The portion 46 has a central passage 48 therethrough, and a downwardly extending annular portion 50, the lower end of which forms valve seat 52.

A valve member 54 is slidably positioned in the tubular member 32 below the valve seat 52. The details of the valve member 54 are clearly shown in FIGS. 4, 5 and 6. The valve member 54 has a cylindrical body 56 that slidably cooperates with the cylindrical inner wall of the member 32 and an annular reduced diameter upper portion 58 defining a chamber 60 into which is positioned a resilient plug 62. The upper end of the annular portion 58 is staked at 64 to hold the plug in the chamber 60. The plug 62 being resilient cooperates with the annular valve seat 52 when the member 54 is in raised position to close the passage 48 and prevent water from flowing into the trough 16. An outlet tube 66 is attached to the tubular member 32 below the valve seat portion 46 to discharge water into the trough 16 when the valve is open.

The lower end of the tubular housing 32 is slotted at 68 and 70, and a valve operator member 72 is pivotally mounted in the slots on a pivot shaft 74 that is supported in an off center position on the lower end of the tubular member 32, see FIG. 5.

The operator member 72 has an edge or surface 76 that operatively engages the lower surface 78 of the valve member 54. The operator member 72 also has an arm portion 80 that extends outwardly from the tubular housing member 32 with a float 82 pivotally connected to its opposite end. The float 82 is attached to the arm by a member 84 that has an odd shaped opening 86 therethrough. The opening 86 has a plurality of round portions, any one of which can be selected for rotatably locating a stud 88 that is attached to the arm 80. A tongue 89 is struck in the arm 80 adjacent to the member 84 to limit the relatively angular movement of the member 84 on the arm 80. The float 82 rides on the water in the trough and as the water level changes it opens or closes the valve. For example, when the water level in the trough is low the float 82 and the arm 80 move down. In this condition which is illustrated in FIG. 4 the arm 80 moves the edge 76 to a position opening the valve to admit more water into the trough. As water flows into the trough, the float 82 rises and in so doing raises the arm 80 causing the edge 76 to move the valve member 54 upwardly until the resilient plug 62 seats on the valve seat 52 and closes the valve. The closed condition of the valve is illustrated in FIG. 5.

To change the desired water level in the trough it is merely necessary to reposition the stud 88 in the opening 86. This is accomplished by a threaded connection between the stud 88 and the arm 80. If necessary, further adjustment can also be made by loosening the wing nut 36 and repositioning the valve as already noted.

When the cover 22 is raised and held in its vertical position by the clamp 44 the float 82 and the arm 80 can be raised to a vertical inoperative position as illustrated by the dotted outline in FIG. 5. In this position the surface 76 and another surface 77 on the same member engage the valve member 54 and hold the valve closed and inoperative. With the float and arm supported in raised position the trough can be easily and conveniently cleaned and if necessary adjusted. It should also be noted that the pivoted end of the arm 80 is formed of double thickness material for increased strength and also to increase the areas of contact between the arm 80 and the valve member 54.

In the embodiment of the invention shown in the drawing, a cylindrical tube 90 is rotatably mounted extending between the brackets 18 at opposite ends of the trough 16. The rotatability of the tube 90 prevents the poultry or other livestock from perching above the trough and in this way prevents the trough from unnecessarily becoming contaminated by the birds.

Many variations in the construction of the subject watering device and many different uses for the valve means employed thereon can be made and are contemplated as being within the scope of the invention. For example, the subject valve can be used on any device where it is desired to maintain a predetermined liquid level.

Thus, there has been shown and described novel valve means and a novel waterer construction which fulfills all of the objects and advantages sought therefor. However, many changes, modifications and variations and many other uses for the subject valve means will become apparent to those skilled in the art after considering this specification and the accompanying drawing. All such changes, modifications, variations and uses of the subject device which do not depart from the spirit and scope of the invention are deemed covered by the invention which is limited only by the claims which follow.

What is claimed is:

1. A poultry waterer or the like comprising a substantially horizontal water trough, and means for controlling the water level in the trough, said last named means including a valve having a tubular portion extending downwardly into the trough, means for connecting the upper end of the tubular portion to a source of water, valve means in said tubular portion including a stationary valve seat inside the tubular member, a valve member in the tubular member movable toward and away from the valve seat, and operator means engageable with the valve member, said last named means including a rigid arm pivotally connected at an offset position to the tubular member, an offset toggle locking and operating means comprising a first elevated surface on said arm adjacent to the pivot engaging the movable valve member in one position, a second cam surface on said arm adjacent to the first surface and removed away from said arm pivot and so constructed and arranged to cam the movable valve member into a toggle locking closed position, both said surfaces being in locking contact with said valve member in said closed position when said arm is rotated about said offset pivot to a substantially vertical position while simultaneously locking said arm and float in the said vertical position, and a float member connected to the arm and engageable with the water in the trough, said float positively moving the arm on its pivotal connection in response to changes of water level in the trough to positively control the position of the valve member relative to the valve seat.

2. The waterer defined in claim 1 including means for adjustably positioning the valve means in a vertical direction with respect to the trough, and wherein said float has a pivotal connection to the said arm, which connection is vertically adjustable to a number of predetermined positions with respect to the arm to change the controlled depth of water in the trough, and means to limit relative movement between the float and the arm.

3. The waterer defined in claim 1 wherein a hinged cover member encloses a space above the trough and around the water level control means, said cover member being movable to a position exposing the said control means and including means on said cover member for securing said cover member in an open position.

4. The structure defined in claim 1 including a cylindrical tube rotatably mounted between the support means above the trough.

References Cited by the Examiner

UNITED STATES PATENTS

| 976,874 | 11/10 | Hasman | 119—78 |
|---|---|---|---|
| 1,393,303 | 10/21 | Martin | 119—80 |
| 2,477,138 | 7/49 | Olson | 119—80 |
| 2,541,622 | 2/51 | Toadvine | 119—80 |
| 2,614,532 | 10/52 | Steel | 119—78 |
| 2,701,548 | 2/55 | Wolfe | 119—51.5 |
| 2,865,328 | 12/58 | Hostetler | 119—72 |
| 2,921,556 | 1/60 | Nilsen | 119—80 |
| 3,052,215 | 9/62 | Shold | 119—78 |

FOREIGN PATENTS 765,749  1/57  Great Britain.

SAMUEL KOREN, Primary Examiner.
ALDRICH F. MEDBERY, Examiner.